United States Patent
Ichikawa et al.

(10) Patent No.: US 9,457,937 B2
(45) Date of Patent: Oct. 4, 2016

(54) SPOUTED BAG BODY

(71) Applicant: HOSOKAWA YOKO CO., LTD., Tokyo (JP)

(72) Inventors: Toru Ichikawa, Misato (JP); Tsutomu Hara, Asaka (JP); Tomio Tahara, Ageo (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 0 days.

(21) Appl. No.: 14/612,202

(22) Filed: Feb. 2, 2015

(65) Prior Publication Data

US 2015/0217906 A1 Aug. 6, 2015

(30) Foreign Application Priority Data

Feb. 3, 2014 (JP) .................. 2014-018419

(51) Int. Cl.
*B65D 35/38* (2006.01)
*B65D 35/46* (2006.01)
(Continued)

(52) U.S. Cl.
CPC .............. *B65D 35/38* (2013.01); *B65D 35/46* (2013.01); *B65D 51/10* (2013.01);
(Continued)

(58) Field of Classification Search
CPC ...... B65D 35/00; B65D 35/02; B65D 35/44; B65D 35/38; B65D 35/46; B65D 75/5883; B65D 51/10; B65D 47/2018; B65D 47/08; B65D 25/46; B65D 47/2075; F16K 15/148; F16K 15/181; F16K 15/188; F16K 15/185; F16K 17/02; Y10T 137/7856; Y10T 137/7847; Y10T 137/7848
See application file for complete search history.

(56) References Cited

U.S. PATENT DOCUMENTS 3,165,242 A * 1/1965 Jackson ................. B65D 35/46 222/495
3,456,650 A * 7/1969 Schwartzman .... B65D 47/2075 215/260

(Continued)

FOREIGN PATENT DOCUMENTS

| DE | 102011078465 B3 | 7/2012 |
| EP | 1798157 A1 | 6/2007 |
| FR | 1352229 | 2/1964 |
| JP | A-2006-076615 | 3/2006 |
| JP | 2009012773 | 1/2009 |

OTHER PUBLICATIONS

Extended EP search report mailed Jun. 18, 2015 for Application No. 15153436.9. (5 pages).

*Primary Examiner* — Frederick C Nicolas
(74) *Attorney, Agent, or Firm* — Nixon Peabody LLP; Khaled Shami

(57) ABSTRACT

Provided is a spouted bag body capable of having the same function as that of a check valve and allowing contents to easily come out by tilting a spout downward without applying excessive pressure to a bag body. A spouted bag body includes: a spout having a body portion formed in a cylindrical shape, and a valve portion disposed inside a cylindrical hole of the body portion; and a bag body attached to the body portion to seal an opening of the cylindrical hole on one side, in which the body portion is provided with a narrowed portion which protrudes from an inner surface of the cylindrical hole over an entire circumference thereof, and the valve portion includes a support portion attached to the body portion, and a movable portion which is formed of a material having elasticity, is connected to the support portion, and covers an opening of the narrowed portion on the other side by coming into contact with an edge portion of the opening of the narrowed portion on the other side.

16 Claims, 9 Drawing Sheets

(51) Int. Cl.
*B65D 51/10* (2006.01)
*B65D 75/58* (2006.01)
*F16K 17/02* (2006.01)
*B65D 47/20* (2006.01)
*B65D 25/46* (2006.01)
*F16K 15/18* (2006.01)
*B65D 35/44* (2006.01)
*B65D 35/02* (2006.01)
*B65D 35/00* (2006.01)
*B65D 47/08* (2006.01)
*F16K 15/14* (2006.01)

(52) U.S. Cl.
CPC .......... *B65D 75/5883* (2013.01); *B65D 25/46* (2013.01); *B65D 35/00* (2013.01); *B65D 35/02* (2013.01); *B65D 35/44* (2013.01); *B65D 47/08* (2013.01); *B65D 47/2018* (2013.01); *F16K 15/148* (2013.01); *F16K 15/185* (2013.01); *F16K 17/02* (2013.01); *Y10T 137/7847* (2015.04); *Y10T 137/7848* (2015.04); *Y10T 137/7856* (2015.04)

(56) References Cited

U.S. PATENT DOCUMENTS

| | | | | |
|---|---|---|---|---|
| 4,941,598 A * | 7/1990 | Lambelet, Jr. | ...... | B05B 11/3004 222/321.6 |
| 5,687,882 A * | 11/1997 | Mueller | ............ | B65D 47/2081 222/212 |
| 6,644,510 B2 * | 11/2003 | Kawolics | ........... | B65D 47/2075 222/105 |
| 6,889,707 B2 * | 5/2005 | Nicolino | ................ | F16K 15/148 137/513.3 |
| 7,222,751 B2 * | 5/2007 | Kerman | ................. | B65D 35/46 222/494 |
| 7,959,045 B2 * | 6/2011 | Kuge | ...................... | B31B 19/84 137/541 |
| 8,740,023 B2 * | 6/2014 | Geiger | ............... | B65D 47/2025 222/213 |
| 2004/0007601 A1 * | 1/2004 | Masuda | ............. | B65D 47/2075 222/494 |
| 2006/0006194 A1 * | 1/2006 | Niggemyer | .......... | B65D 1/0246 222/107 |
| 2008/0041890 A1 * | 2/2008 | Masuda | ............. | B65D 35/14 222/496 |
| 2012/0205404 A1 * | 8/2012 | Massey | ............... | B65D 35/24 222/494 |
| 2013/0119092 A1 * | 5/2013 | Kuwagaki | .......... | B65D 75/5883 222/494 |
| 2014/0151390 A1 | 6/2014 | Kohler et al. | | |

\* cited by examiner

SPOUTED BAG BODY

BACKGROUND OF THE INVENTION

1. Field of the Invention

The present invention relates to a spouted bag body in which a bag body having flexibility is attached to a spout.

Priority is claimed on Japanese Patent Application No. 2014-018419, filed Feb. 3, 2014, the contents of which are incorporated herein by reference.

2. Description of Related Art

Hitherto, in order to hold liquids such as beverages, instead of a relatively hard container such as a plastic bottle, a soft bag body having flexibility, called a pouch has been used. The main reason is that the bag body holds the liquid therein and is deformed according to usage or is deformed into a compact size as the amount of the liquid contained therein is reduced.

In order to spout the liquid from the bag body, a spouted bag body in which a spout having a cylindrical hole formed in a cylindrical shape for communication between the inside and the outside of the bag body is attached to the bag body may be used. The edge portion of the bag body excluding a part to which the spout is attached is water-tightly (liquid-tightly) sealed. By gripping the bag body with a hand and increasing the internal pressure of the bag body, the liquid in the bag body can be allowed to come out through the cylindrical hole of the spout.

As this type of spouted bag body, for example, a spouted bag body described in Japanese Unexamined Patent Application, First Publication No. 2006-76615 is known. In this spouted bag body, a bag body is bonded to an end portion on a side opposite to the mouth of a spout, to which a cap is detachably attached, so as to be sealed.

The spout is formed in a substantially cylindrical shape, and the cylindrical hole thereof functions as a flow passage of a liquid. The inner circumferential surface of the spout is provided with an engagement groove that extends in the circumferential direction.

The spout has a built-in check valve which opens and closes the flow passage. The check valve is constituted by a biasing member fixed to the inner circumferential surface of the spout, and a spool which is provided to be movable in the axial direction of the spout and is biased toward the bag body side of the spout from the mouth side of the spout by the biasing member.

The biasing member is constituted by a fixed portion formed in a cylindrical shape and a coil spring which is formed integrally with the fixed portion and extends toward the bag body side of the spout from the fixed portion. The fixed portion is fixed to the spout by fitting an engagement claw formed in the outer circumferential surface of the fixed portion into the engagement groove of the spout.

The leading end of the coil spring is provided with a disk-like end plate. A hole is formed at the center of the end plate so as to allow the spool to be engaged therewith.

The biasing member has a liquid dripping prevention portion which prevents the contents from dripping from the mouth of the spout at an end portion on a side opposite to the coil spring of the fixed portion. A seat surface is formed in the inner surface of the liquid dripping prevention portion.

On the other hand, the spool is constituted by a shaft portion which is inserted into the biasing member, and a disk-like valve body provided at one end of the biasing member in the axial direction. The shaft portion is provided with a stopper of which the leading end is tapered like an arrowhead, and the root portion of the stopper is provided with a locking groove that is formed to extend on the outer circumferential surface of the shaft portion along the circumferential direction. The spool is integrated with the biasing member as the locking groove is engaged with the hole of the end plate.

When the spool and the biasing member are integrated with each other, the spool causes the coil spring of the biasing member to be maintained in a state of being compressed from its natural length. Accordingly, the valve body of the spool is in a state of being constantly biased toward the seat surface of the liquid dripping prevention portion.

The spouted bag body configured as described above operates as follows.

In a case where the internal pressure of the bag body is low, the spool is in a state of being pressed against the bag body side by the biasing force of the coil spring. The valve body abuts the seat surface and blocks the flow passage of the spout. Accordingly, infiltration of air into the bag body via the spout is reliably suppressed, and thus oxidation of the contents is prevented.

On the other hand, when the internal pressure of the bag body is increased by gripping the bag body with a hand or the like, the contents are pressed against the end plate provided in the coil spring. The contents push the spool upward toward the mouth side against the biasing force of the coil spring. Accordingly, the valve body of the spool is separated from the seat surface of the liquid dripping prevention portion, and thus the flow of the contents into the spout is secured. The contents then pass through the check valve and the liquid dripping prevention portion and come out from the mouth of the spout to the outside.

However, in a case where the contents stored in the bag body is a liquid (beverage) such as wine or Japanese liquor, when the bag body is gripped with a hand, it is possible that the liquid may come out from the spout very forcefully and spray may scatter around the spout, which is not preferable. Because of the nature of the liquid, it is desirable that the liquid is gently poured from the bag body in a state where the spout is placed on the lower side.

SUMMARY OF THE INVENTION

The present invention is made taking the foregoing circumstances into consideration, and an object thereof is to provide a spouted bag body capable of having the same function as that of a check valve and allowing contents to easily come out by tilting a spout downward without applying excessive pressure to a bag body.

In order to solve the problems, the invention suggests the following means.

A first aspect of the present invention is a spouted bag body which includes: a spout having a body portion formed in a cylindrical shape, and a valve portion disposed inside a cylindrical hole of the body portion; and a bag body attached to the body portion to seal an opening of the cylindrical hole on one side, in which the body portion is provided with a narrowed portion which protrudes from an inner surface of the cylindrical hole over an entire circumference thereof, and the valve portion includes a support portion attached to the body portion, and a movable portion which is formed of a material having elasticity, is connected to the support portion, and covers an opening of the narrowed portion on the other side by coming into contact with an edge portion of the opening of the narrowed portion on the other side.

A second aspect of the present invention is, in the first aspect, the spout includes a first locking portion provided to protrude from an inner circumferential surface of the narrowed portion, and a second locking portion provided to protrude from the inner circumferential surface of the narrowed portion at a position separated from the first locking portion on one side, and the support portion is provided with a locked portion which is locked onto the second locking portion on one side and is locked onto the first locking portion on the other side when the movable portion comes into contact with the edge portion of the opening of the narrowed portion on the other side.

A third aspect of the present invention is, in the second aspect, the first locking portion and the second locking portion are provided so as not to overlap each other when viewed in an axis direction of the body portion.

A fourth aspect of the present invention is, in the second or third aspect, the length of the locked portion in the axis direction of the body portion is shorter than the distance between the first locking portion and the second locking portion in the axis direction.

A fifth aspect of the present invention is, in any one of the second to fourth aspect, the movable portion is formed in a plate shape, the support portion is provided on one surface of the movable portion, and the valve portion includes a second support portion provided on the other surface of the movable portion, and a second locked portion which is provided in the second support portion and is locked onto the second locking portion on one side and is locked onto the first locking portion on the other side when the other surface of the movable portion comes into contact with the edge portion of the opening of the narrowed portion on the other side.

A sixth aspect of the present invention is, in any one of the second to fifth aspect, a ring-like receiving portion having the axis of the body portion as a center axis is provided on a surface of the narrowed portion on the other side, and when the valve portion is attached to the body portion by locking the locked portion onto the first locking portion and the second locking portion of the body portion, the movable portion comes into contact with the receiving portion.

A seventh aspect of the present invention is a spouted bag body which includes: a spout having a body portion formed in a cylindrical shape, and a valve portion disposed inside a cylindrical hole of the body portion; and a bag body which has flexibility and is attached to the body portion to seal an opening of the cylindrical hole on one side, in which the valve portion includes a support portion attached to the body portion, and a movable portion which is formed of a material having elasticity, is connected to the support portion, and covers an opening of the cylindrical hole on the other side by coming into contact with an edge portion of the opening of the cylindrical hole on the other side.

According to the spouted bag bodies of the present invention, the same function as that of a check valve is provided, and contents can be allowed to easily come out by tilting the spout downward without applying excessive pressure to the bag body.

DETAILED DESCRIPTION OF THE INVENTION

First Embodiment

Hereinafter, a first embodiment of a spouted bag body according to the present invention will be described with reference to FIGS. 1 to 9.

Figure 1:
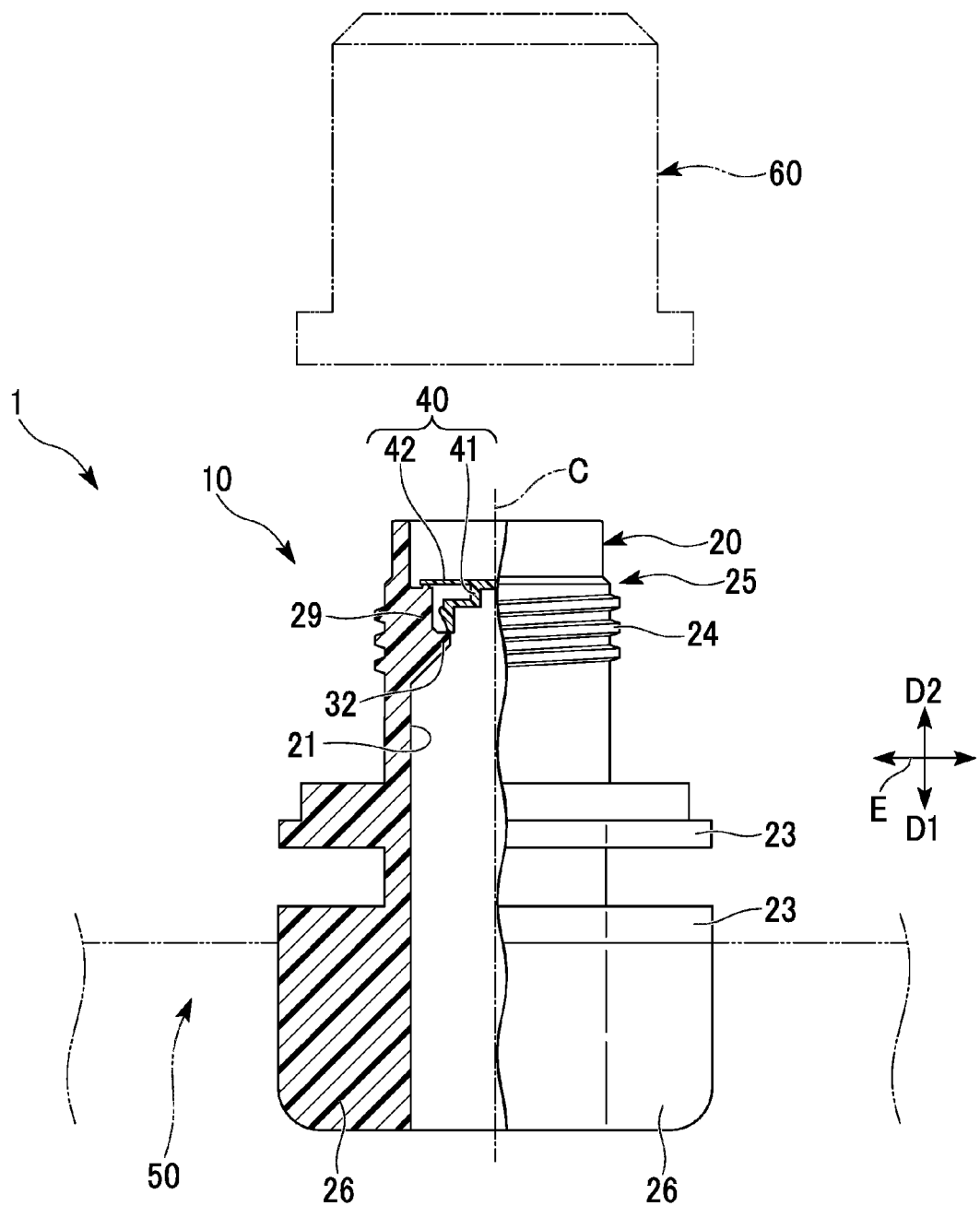
FIG. 1 is a partially cutaway front view of main parts of a portion of a spouted bag body of a first embodiment of the present invention.
Figure 2:
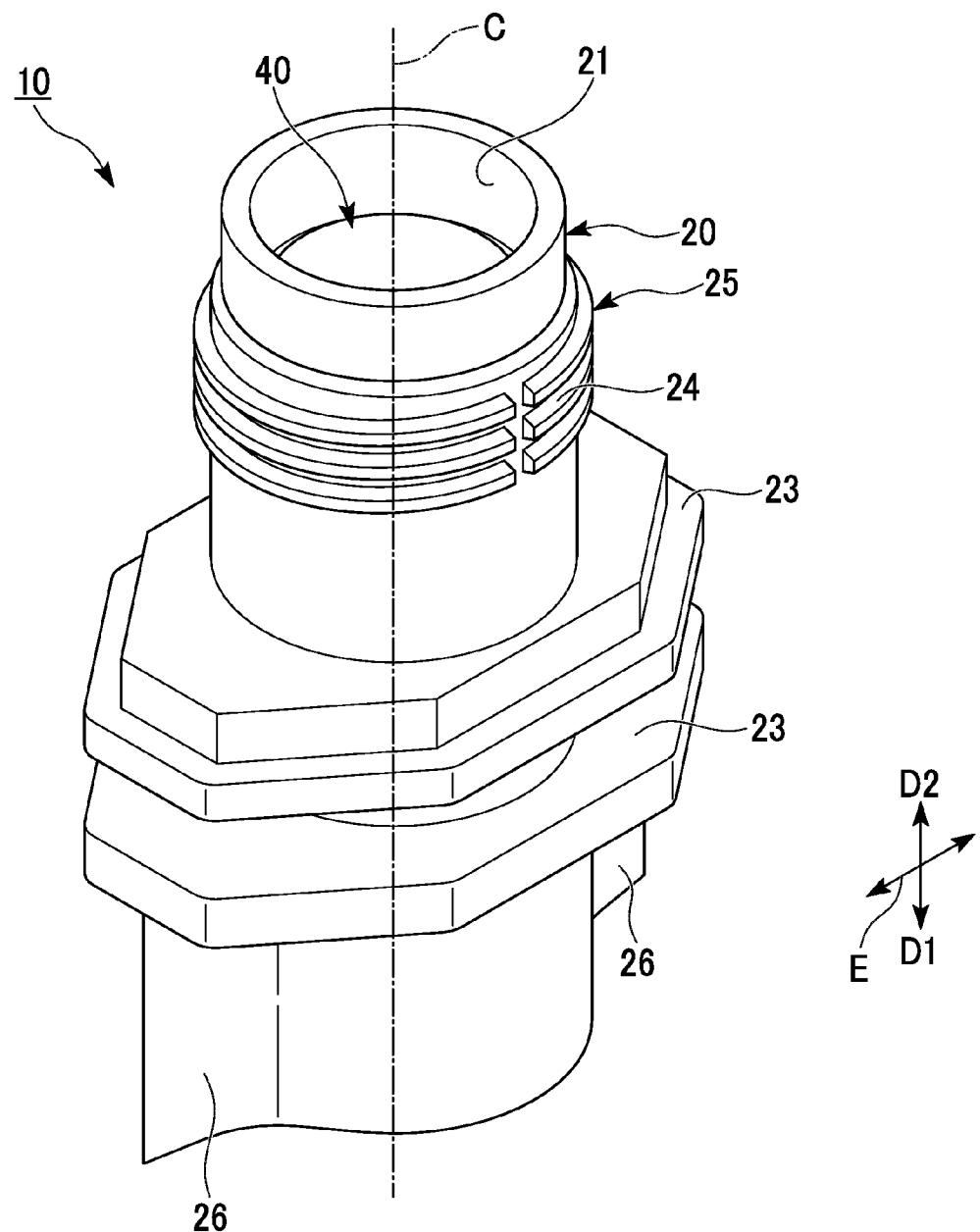
FIG. 2 is a perspective view of a spout of the spouted bag body.
Figure 3:
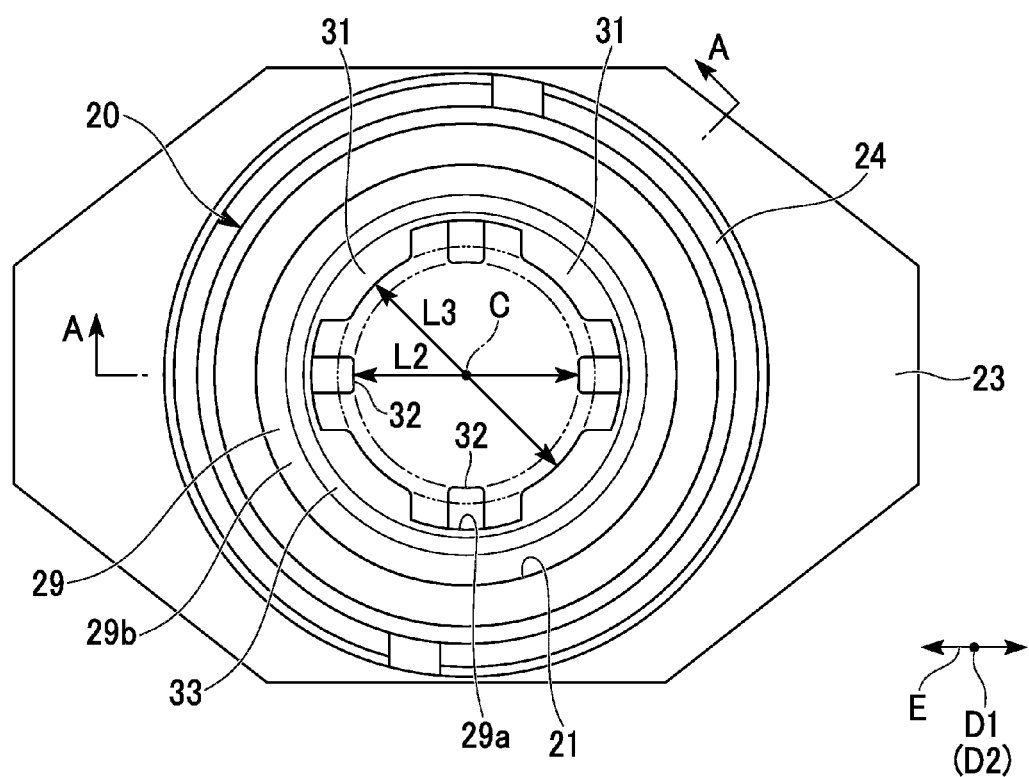
FIG. 3 is a plan view of the spout.

As shown in FIGS. 1 to 3, a spouted bag body 1 of this embodiment includes a spout 10 having a body portion 20 formed in a cylindrical shape and a valve portion 40 disposed in a cylindrical hole 21 of the body portion 20, and a bag body 50 attached to the body portion 20 so as to seal the opening one side D1 of the cylindrical hole 21.

For the convenience of description, in FIG. 1, the bag body 50 and a cap 60, which will be described later, are shown by a two-dot chain line, and in FIG. 3, the body portion 20 of the spout 10 and the like are shown and the valve portion 40 is not shown.

A plurality of flanges 23 are provided on the outer circumferential surface of the body portion 20, at the intermediate portion of the body portion 20 in an axis (center axis) C direction. The plurality of flanges 23 are arranged in the axis C direction and are provided in a state of being separated from each other.

A spiral thread 24 is formed on the outer circumferential surface of the body portion 20 around the axis C at a position closer to the other side D2 of the cylindrical hole 21 than the plurality of flanges 23, and the other side D2 of the body portion 20 and the thread 24 constitute a male screw portion 25.

A pair of protrusions 26 which protrude in an orthogonal direction E orthogonal to the axis C are provided on the outer circumferential surface of the body portion 20 at a position closer to one side D1 of the body portion 20 than the plurality of flanges 23. The outer surfaces of the body portion 20 and the pair of protrusions 26 as a whole are formed in a long, flat shape in the orthogonal direction E.

Figure 4:
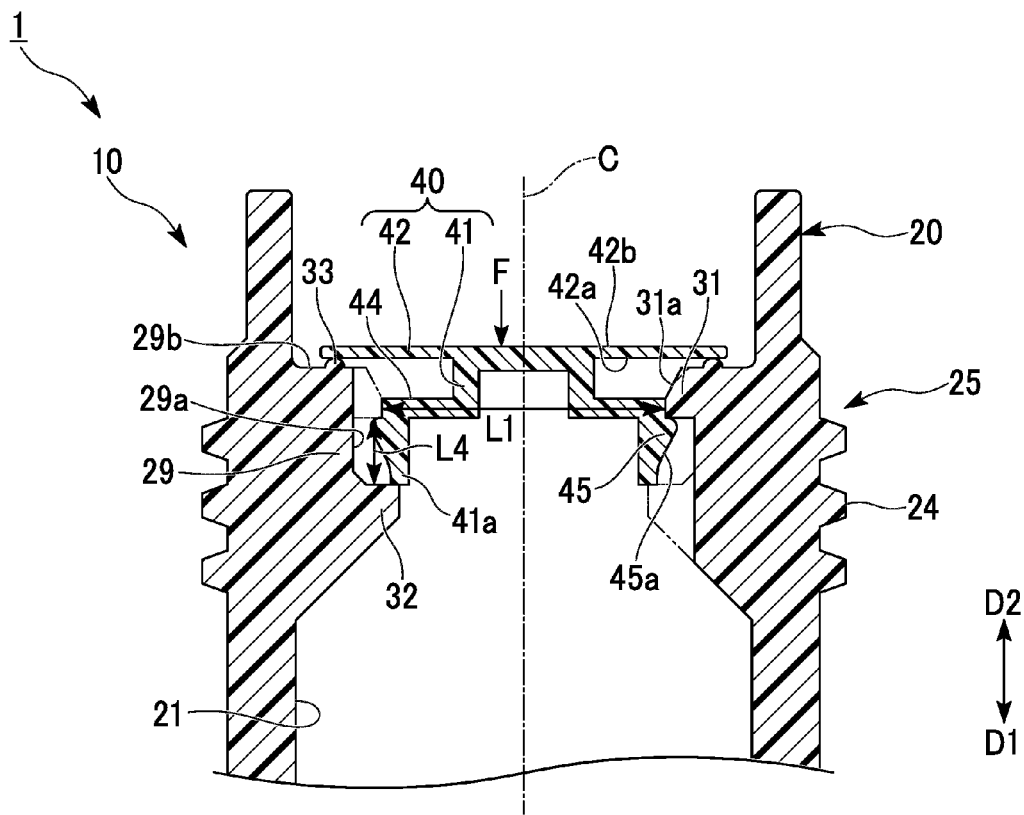
FIG. 4 is a cross-sectional view taken along line A-A of FIG. 3.

As shown in FIGS. 3 and 4, on the other side D2 of the body portion 20, a narrowed portion 29 is provided to protrude from the inner surface of the cylindrical hole 21 over the entire circumference. The narrowed portion 29 is formed in a cylindrical shape and has a through-hole 29a formed to extend along the axis C.

The spout 10 includes a first locking portion 31 and a second locking portion 32 provided to protrude from the inner circumferential surface of the narrowed portion 29 toward the axis C. In addition, in FIGS. 3, 4, and 7 to 11, positions corresponding to the positions where the locking portions 31 and 32 are provided in the circumferential direction are shown by a two-dot chain line.

An outer surface 31a of the first locking portion 31 on the axis C side that is the other side D2 is inclined to become close to the axis C moving toward one side D1. In this example, four first locking portions 31 are provided in the spout 10 and are arranged so as to be separated from each other around the axis C.

Four second locking portions 32 are provided in the spout 10 and are arranged to be separated from each other around the axis C. Each of the second locking portions 32 is provided at a position separated from the first locking portion 31 on one side D1. That is, a gap in which a locked portion 45, which will be described later, is fitted is formed between the first locking portion 31 and the second locking portion 32 in the axis C direction.

The first locking portions 31 and the second locking portions 32 are provided so as not to overlap each other when viewed in the axis C direction shown in FIG. 3.

As shown in FIGS. 3 and 4, a ring-like receiving portion 33 having the axis C as the center axis is provided on a surface 29b of the narrowed portion 29 on the other side D2. A cross-section of the receiving portion 33 taken along a plane including the axis C is formed in a semicircular shape which protrudes toward the other side D2.

The body portion 20, the flanges 23, the thread 24, the protrusions 26, the narrowed portion 29, the locking portions 31 and 32, and the receiving portion 33 are integrally formed of a resin such as polypropylene or polyethylene.

Figure 5:
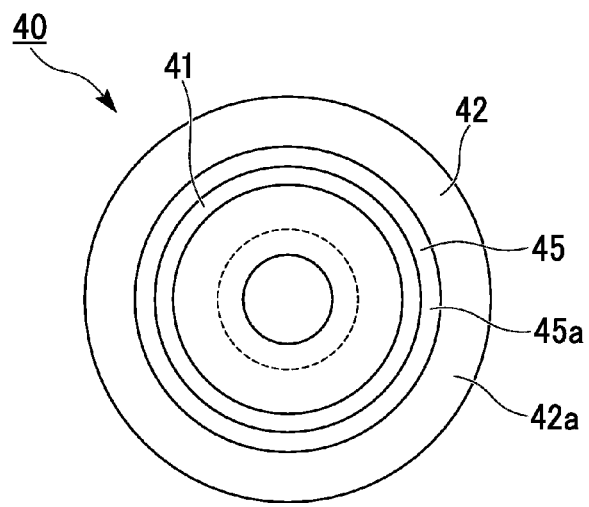
FIG. 5 is a bottom view of a valve portion of the spout.
Figure 6:
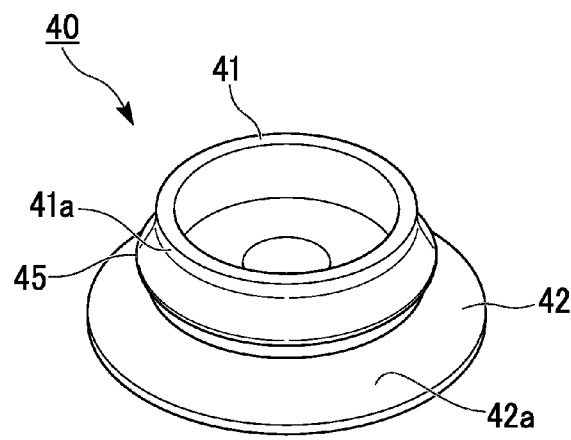
FIG. 6 is a perspective view of the valve portion.

As shown in FIGS. 4 to 6, the valve portion 40 includes a support portion 41 attached to the body portion 20 and a movable portion 42 connected to the support portion 41, and thus is of a so-called umbrella type valve.

The support portion 41 is formed in a cylindrical shape and is reduced in diameter on the other side D2 so as to form a stepped portion 44. The locked portion 45 is provided on the outer circumferential surface of a widened portion 41a of the support portion 41 provided closer to one side D1 than the stepped portion 44 over the entire circumference. An outer surface 45a of the locked portion 45 on one side D1 that is the side opposite to the axis C is inclined to become close to the axis C moving toward one side D1.

An outer diameter L1 of the widened portion 41a of the support portion 41 on the other side D2 shown in FIG. 4 is greater than an outer diameter L2 of a virtual circle specified by the edge portions of the second locking portions 32 on the axis C side and is smaller than an outer diameter L3 of a virtual circle specified by the edge portions of the first locking portions 31 on the axis C side, the outer diameters being shown in FIG. 3.

As shown in FIG. 4, a length L4 of the locked portion 45 in the axis C direction is the same as the distance between the first locking portion 31 and the second locking portion 32 in the axis C direction.

The movable portion 42 is formed in a disk shape as shown in FIGS. 4 to 6. The support portion 41 described above is provided on one surface 42a of the movable portion 42. The outer diameter of the movable portion 42 is greater than the outer diameter L1 of the support portion 41 and is equal to or greater than the outer diameter of the receiving portion 33. The thickness of the movable portion 42 is, for example, preferably 0.1 to 5.0 mm, and is more preferably 0.2 to 3.0 mm.

The support portion 41 and the movable portion 42 are integrally formed of a material having elasticity such as polypropylene, polyethylene, silicone rubber, or nitrile butadiene rubber (NBR) by injection molding or the like.

In the valve portion 40, when one surface 42a of the movable portion 42 comes into contact with the edge portion of the opening of the through-hole 29a of the narrowed portion 29 on the other side D2 via the receiving portion 33 and thus covers the opening, the locked portion 45 is locked onto the second locking portion 32 on one side D1 and is locked onto the first locking portion 31 on the other side D2. Although the first locking portions 31 and the second locking portions 32 do not overlap each other when viewed in the axis C direction, since the locked portion 45 is locked onto the second locking portion 32 on one side D1 and is locked onto the first locking portion 31 on the other side D2 at any position around the axis C, the locked portion 45 is locked onto the body portion 20 on any of one side D1 and the other side D2.

As the movable portion 42 comes into contact with the receiving portion 33, a space between the receiving portion 33 and the movable portion 42 is sealed.

It is preferable that a contact force between the receiving portion 33 and the movable portion 42 when coming into contact with each other when the locked portion 45 is locked onto the locking portions 31 and 32 is as small as possible in a range in which a gap is not formed between the receiving portion 33 and the movable portion 42.

When the locked portion 45 is locked onto the locking portions 31 and 32 and thus the valve portion 40 is attached to the body portion 20, the body portion 20 extends toward the other side D2 further from the movable portion 42.

The bag body 50 is formed of a film material having flexibility such as a single-layer film or a laminate film, in other words, a soft film material in a bag shape such as a flat bag or a gusset type. In a case where the laminate film is used as the film material of the bag body 50, a laminate of a base material layer and a thermal fusion layer may be appropriately used.

As the base material layer, a film having excellent printability and further having piercing resistance, tensile strength, and impact resistance is preferable. Examples of the material of the base material layer include polyethylene terephthalate, polypropylene, polyamide, and an ethylene vinyl alcohol copolymer, and a biaxially stretched film or a uniaxially stretched film thereof is preferable. In addition, in order to impart oxygen barrier properties or water vapor barrier properties to the film, a deposition film in which metal such as aluminum or magnesium or an oxide such as silicon oxide is deposited, a coated film in which a barrier coating agent such as polyvinylidene chloride is coated, or the like may also be used.

The base material layer may be a single body of the film or a multi-layer film obtained by combining and co-extruding the films. The thickness of the base material layer is preferably 6 to 50 μm (micrometers), and more preferably 9 to 30 μm.

The thermal fusion layer is a layer that can be heat-sealed. Examples of the material of the thermal fusion layer include high-density polyethylene, low-density polyethylene, linear low-density polyethylene, and polypropylene, and an unstretched film thereof or a multi-layer film obtained by combining and co-extruding the resins is preferable. The thickness of the thermal fusion layer is preferably 10 to 200 μm, and more preferably 20 to 150 μm.

The laminate film may have an intermediate layer between the base material layer and the thermal fusion layer as necessary.

Examples of the intermediate layer include a film having characteristics such as oxygen barrier properties, water vapor barrier properties, pinhole resistance, and impact resistance. Examples of the material of the intermediate layer include a metal foil such as aluminum foil, the above-described deposition film and the coated film, and various types of functional films. Two intermediate layers may also be provided as necessary. The thickness of the intermediate layer is preferably 6 to 50 μm, and more preferably 9 to 30 μm.

The laminate film including the base material layer, the thermal fusion layer, and the intermediate layer which is used as necessary, may be manufactured by bonding the layers using a well-known method such as dry laminating using an adhesive or an extrusion laminating method using a thermal adhesive resin.

The bag body 50 configured and manufactured as above is water-tightly attached to the outer surface of the body portion 20 so as to cover the periphery of the opening of the body portion 20 on one side D1 through a heat sealing method which is a well-known thermal fusion method, or the like. That is, by attaching the edge portion of the opening of the bag body 50 to the outer surface of the body portion 20 on one side D1, the opening of the body portion 20 on one side D1 is sealed by the bag body 50. At this time, the internal space of the bag body 50 and the cylindrical hole 21 of the body portion 20 communicate with each other.

In this embodiment, the spouted bag body 1 is used together with the well-known cap 60 shown in FIG. 1. The cap 60 is formed in a cylindrical shape with a bottom, although not shown in detail, and has a female screw portion formed on the inner circumferential surface to be screwed to the male screw portion 25 of the body portion 20.

By screwing the female screw portion of the cap 60 to the male screw portion 25 of the body portion 20, the opening of the cylindrical hole 21 of the body portion 20 on the other side D2 can be water-tightly sealed.

The cap 60 is not an essential element of the spouted bag body 1.

Filling the bag body 50 of the spouted bag body 1 configured as described above with the liquid contents such as wine is performed in the following order.

Figure 7:
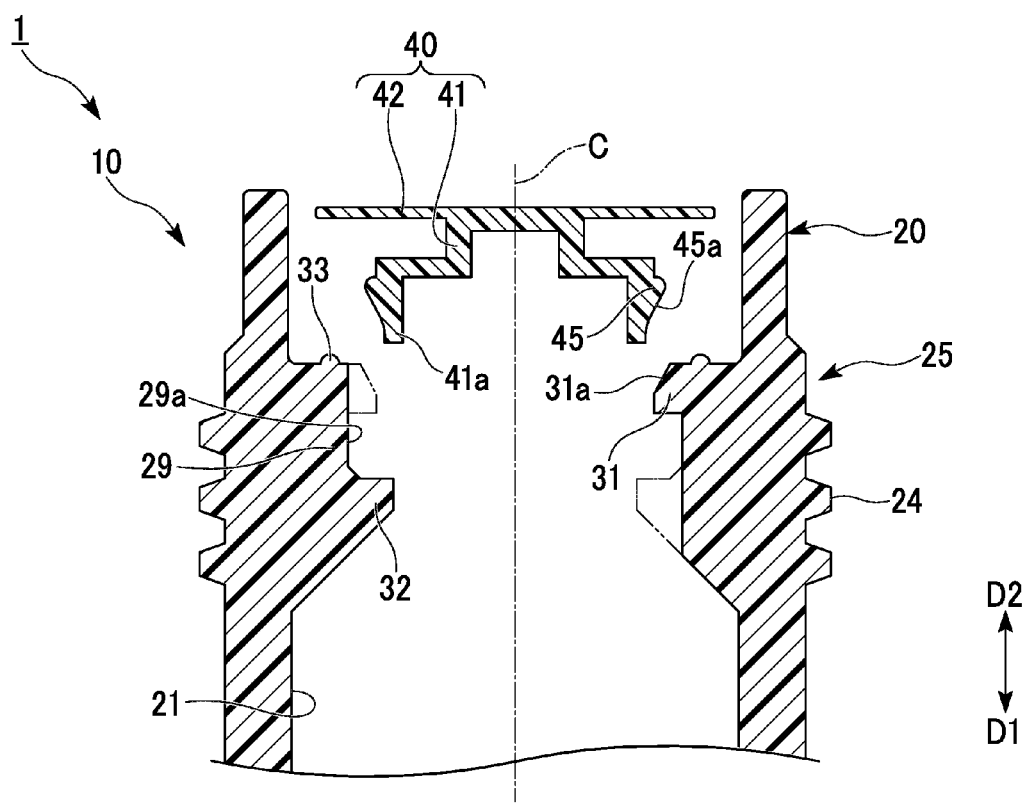
FIG. 7 is a cross-sectional view showing a procedure of filling the spouted bag body with a liquid.

As shown in FIG. 7, the spouted bag body 1 in a state in which the valve portion 40 is not attached to the body portion 20 and the bag body 50 (not shown) is attached to the body portion 20 is prepared.

Thereafter, the internal space of the bag body 50 is filled with the contents (not shown) by a well-known filling machine through the cylindrical hole 21 of the body portion 20 from the other side D2.

When filling the internal space of the bag body 50 with the liquid is ended, although not shown, the valve portion 40 is supplied from a parts feeder in which a number of valve portions 40 are stored so that the support portion 41 is placed on the leading end side, and the valve portion 40 is pressed into the cylindrical hole 21 from the other side D2 of the body portion 20.

Since the outer surface 31a of the first locking portion 31 is inclined as described above, the support portion 41 is guided into the through-hole 29a when the valve portion 40 is pressed. In addition, since the outer surface 45a of the locked portion 45 is inclined as described above, as the outer surface 45a comes into contact with the first locking portion 31, a part of the support portion 41 on one side D1 is guided by the outer surface 45a and is gradually deformed elastically moving toward the axis C such that the locked portion 45 is easily placed over the first locking portion 31.

When the locked portion 45 is placed over the first locking portion 31, since the outer diameter L1 of the support portion 41 and the outer diameter L2 of the virtual circle are set as described above, the end portion of the locked portion 45 on one side D1 is locked onto the second locking portion 32 as shown in FIG. 4. In addition, the support portion 41 is deformed so as to be separated from the axis C by its elastic force, and the end portion of the locked portion 45 on the other side D2 is locked onto the first locking portion 31.

Accordingly, the valve portion 40 is attached to the body portion 20.

Since the locked portion 45 is locked onto the second locking portion 32, the valve portion 40 which is pressed does not drop toward one side D1 passing over the second locking portion 32.

Next, an action of the spouted bag body 1 in which the bag body 50 is filled with the liquid as described above will be described.

As shown in FIG. 4, in a natural state of the movable portion 42 in which no pressure is applied to the other surface 42b of the movable portion 42 from the outside, the receiving portion 33 and the movable portion 42 come into contact with each other, and thus infiltration of the outside air into the internal space of the bag body 50 through the through-hole 29a of the narrowed portion 29 is prevented.

When a pressure F is applied to the other surface 42b of the movable portion 42 from the outside, the movable portion 42 is pressed against the receiving portion 33, and thus a space between the receiving portion 33 and the movable portion 42 is reliably sealed. Accordingly, infiltration of the outside air into the internal space of the bag body 50 is more reliably prevented.

Since the narrowed portion 29 is provided with the receiving portion 33 of which the cross-section is formed in a semicircular shape, the state of the receiving portion 33 and the movable portion 42 is close to a line contact state. Accordingly, even in a case where the movable portion 42 formed in a disk shape is deformed so as to be corrugated or to sink, the receiving portion 33 and the movable portion 42 can be allowed to reliably come into contact with each other over the entire circumferences thereof.

Figure 8:
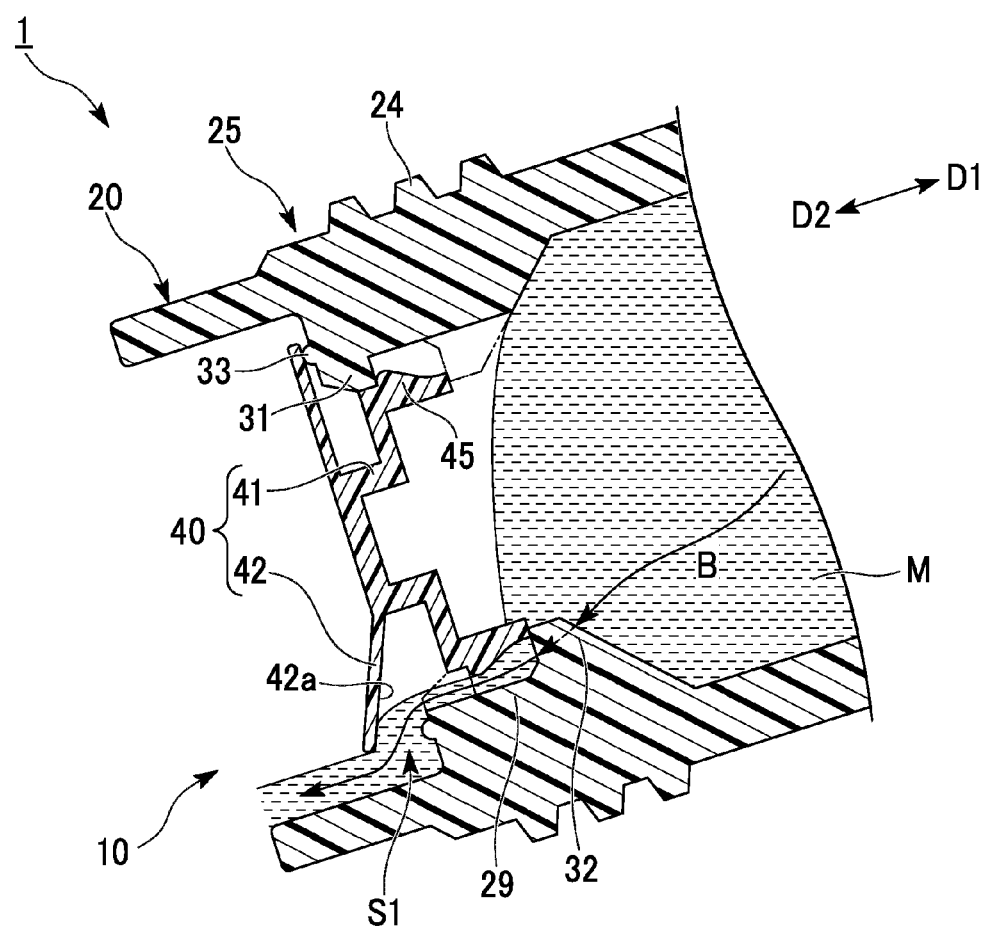
FIG. 8 is a cross-sectional view showing an action of the spouted bag body.

On the other hand, when a user grips the flange 23 of the spout 10 with one hand and supports the bag body 50 with the other hand in order to tilt the spouted bag body 1 so that the spout 10 is placed on a side lower than the bag body 50, as shown in FIG. 8, the liquid M flows toward the other side D2 between the second locking portions 32 adjacent to one another around the axis C from the internal space of the bag body 50 by its own weight as indicated by arrow B. At this time, there is no need to crush the bag body 50 by hand and apply excessive pressure to the bag body 50.

The flowing liquid M applies a pressure to a part of one surface 42a of the movable portion 42 on the lower side. Since the movable portion 42 is formed of a material having elasticity, the edge portion of the movable portion 42 is elastically deformed and is folded back to the other side D2, and thus the movable portion 42 is separated from the receiving portion 33. A gap S1 is formed between the receiving portion 33 and the movable portion 42, and the liquid M flows to the outside from the body portion 20 through a space between the narrowed portion 29 and the support portion 41 and the gap S1 and is poured into a glass (not shown) or the like. As the liquid M flows out from the internal space of the bag body 50, the pressure of the internal space decreases and the bag body 50 is deformed so as to be reduced in size. Therefore, oxidation of the liquid M due to the infiltration of air into the internal space of the bag body 50 can be suppressed.

When a predetermined amount of the liquid M is poured into the glass and the spouted bag body 1 is stood so that the spout 10 is placed on a side higher than the bag body 50, the liquid M does not apply a pressure to one surface 42a of the movable portion 42. Therefore, the movable portion 42 is deformed so as to come into contact with the receiving portion 33 by its elastic force such that a space between the receiving portion 33 and the movable portion 42 is sealed.

The umbrella type valve portion 40 allows the liquid M to flow out toward the other side D2 through the cylindrical hole 21 by its own weight when the spouted bag body 1 is tilted so that the spout 10 is placed on the lower side. When the spouted bag body 1 is stood so that the spout 10 is placed on the upper side, the valve portion 40 prevents the infiltration of air toward one side D1 through the cylindrical hole 21. As described above, the valve portion 40 has the same function as that of the check valve.

As necessary, the female screw portion of the cap 60 is screwed to the male screw portion 25 of the body portion 20 and the spouted bag body 1 is preserved.

As described above, according to the spouted bag body 1 of this embodiment, since the valve portion 40 is provided, the same function as that of the check valve is obtained, and the edge portion of the movable portion 42 is elastically deformed toward the other side D2 by the liquid M stored in the bag body 50 as the spout 10 is tilted to be placed on a side lower than the bag body 50. Accordingly, the movable portion 42 is separated from the narrowed portion 29 provided with the receiving portion 33, and thus the liquid M can be allowed to easily come out through the gap S1 between the receiving portion 33 and the movable portion 42 without applying excessive pressure to the bag body 50.

The locking portions 31 and 32 are provided in the body portion 20 of the spout 10, and the locked portion 45 is provided in the valve portion 40. When the valve portion 40 is pressed from the other side D2 of the body portion 20, the support portion 41 is locked onto the second locking portion 32. Accordingly, when the valve portion 40 is attached to the body portion 20, the dropping of the valve portion 40 toward one side D1 over the second locking portion 32 can be prevented.

The first locking portions 31 and the second locking portions 32 are provided so as not to overlap each other when viewed in the axis C direction. Therefore, in a case where the body portion 20 or the locking portions 31 and 32 are integrally formed by injection molding, a mold can be easily configured without providing a slide in the mold for the injection molding.

The outer surface 45a of the locked portion 45 is inclined to become close to the axis C1 moving toward one side D1. Therefore, when the valve portion 40 is attached to the body portion 20, the support portion 41 can be easily deformed to become close to the axis C, and thus the locked portion 45 can be easily placed over the first locking portion 31.

Since the narrowed portion 29 is provided with the receiving portion 33, the state of the receiving portion 33 and the movable portion 42 of the valve portion 40 is close to a line contact state, and thus the receiving portion 33 and the movable portion 42 can be allowed to reliably come into contact with each other over the entire circumferences thereof.

Figure 9:
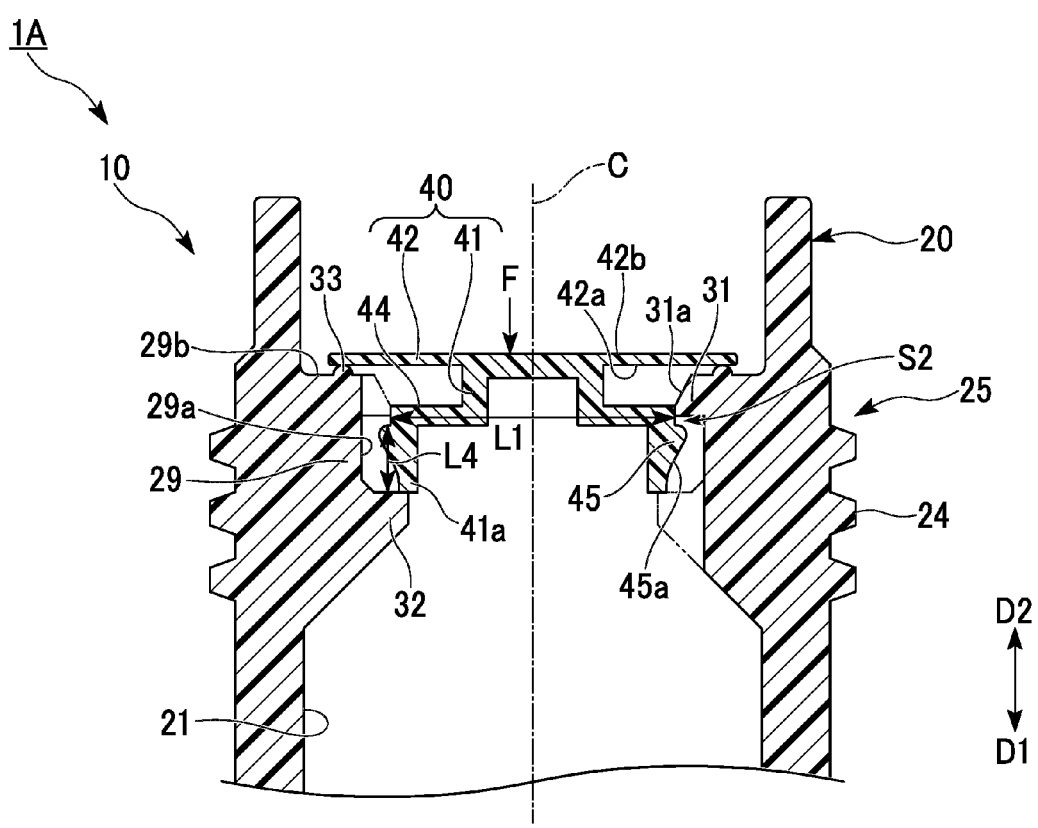
FIG. 9 is a cross-sectional view of main parts of a spouted bag body in a modification example of the first embodiment of the present invention.

In addition, in this embodiment, as in the spouted bag body 1A shown in FIG. 9, the length of the locked portion 45 in the axis C direction may be shorter than the distance between the first locking portion 31 and the second locking portion 32 in the axis C direction. In this case, when the locked portion 45 is locked onto the second locking portion 32, a gap S2 is formed between the first locking portion 31 and the locked portion 45.

When the spouted bag body 1A is tilted so that the spout 10 is placed on the lower side, since the gap S2 is formed, the locked portion 45 is moved toward the other side D2 with respect to the second locking portion 32 by gravity applied to the valve portion 40 or a force applied to the valve portion 40 by the liquid M. Accordingly, the movable portion 42 is easily separated from the receiving portion 33 and thus the liquid M easily comes out from between the receiving portion 33 and the movable portion 42.

Second Embodiment

Next, a second embodiment of the present invention will be described with reference to FIG. 10. Like elements similar to those of the above-described embodiment are denoted by like reference numerals, and description thereof will be omitted and only different parts will be described.

Figure 10:
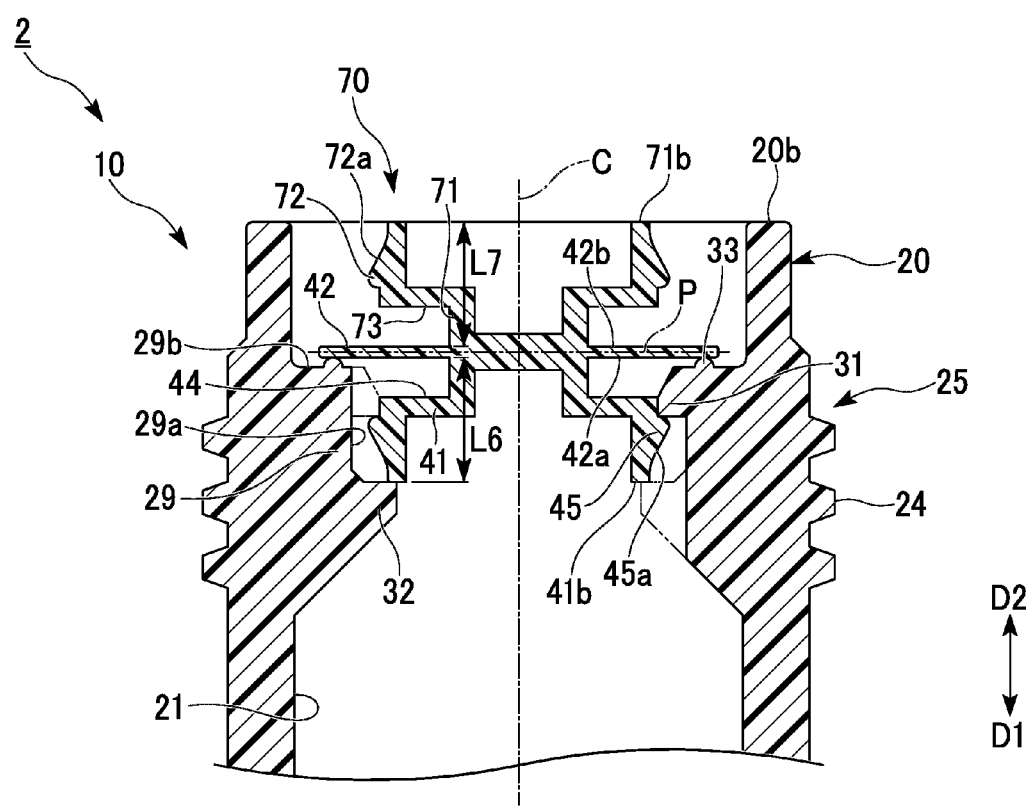
FIG. 10 is a cross-sectional view of main parts of a spouted bag body of a second embodiment of the present invention.

As shown in FIG. 10, a spouted bag body 2 of this embodiment includes a valve portion 70 instead of the valve portion 40 of the spouted bag body 1 of the first embodiment.

The valve portion 70 includes, in addition to each configuration of the valve portion 40, a second support portion 71 provided on the other surface 42b of the movable portion 42 and a second locked portion 72 provided in the second support portion 71.

The second support portion 71 and the second locked portion 72 are formed to be symmetrical to the support portion 41 and the locked portion 45 with respect to a reference plane P specified at the center portion of the movable portion 42 in the thickness direction.

More specifically, the second support portion 71 is formed in a cylindrical shape and is reduced in diameter on one side D1 so as to form a stepped portion 73. The second locked portion 72 is provided on the outer circumferential surface of a part provided closer to the other side D2 than the stepped portion 73 of the second support portion 71 over the entire circumference. An outer surface 72a of the second locked portion 72 on the other side D2 that is the side opposite to the axis C is inclined so as to become close to the axis C1 moving toward the other side D2.

When the other surface 42b of the movable portion 42 comes into contact with the edge portion of the opening of the through-hole 29a of the narrowed portion 29 on the other side D2, the second locked portion 72 is locked onto the second locking portion 32 on one side D1 and is locked onto the first locking portion 31 on the other side D2.

In the axis C direction, a length L6 from one surface 42a of the movable portion 42 to an end 41b of the support portion 41 on the side opposite to the movable portion 42 is equal to a length L7 from the other surface 42b of the movable portion 42 to an end 71b of the second support portion 71 on the side opposite to the movable portion 42. When the valve portion 70 is attached to the body portion 20 by locking the locked portion 45 onto the locking portions 31 and 32 of the body portion 20, an end 20b of the body portion 20 on the other side D2 and an end 71b of the second support portion 71 are flush with each other in the axis C direction.

The valve portion 70 is formed to be symmetrical with respect to the reference plane P as a whole.

In the spouted bag body 2 configured as described above, after filling the internal space of the bag body 50 with a liquid, as in the spouted bag body 1 of the first embodiment, the valve portion 70 is pressed into the cylindrical hole 21 from the other side D2 of the body portion 20 by a parts feeder.

At this time, since the valve portion 70 is formed to be symmetrical with respect to the reference plane P, even in a case where the valve portion 70 is supplied into the cylindrical hole 21 of the body portion 20 so that any of the support portion 41 and the second support portion 71 is placed on the leading end side, the locked portion 45 or 72 is locked onto the locking portions 31 and 32 and thus the valve portion 70 can be attached to the body portion 20. Since the valve portion 70 can be attached to the body portion 20 without adjusting the direction of the valve portion 70, a speed at which the valve portion 70 is attached to the body portion 20 can be increased to, for example, twice the speed in the case of using the valve portion 40 of the first embodiment.

When the valve portion 70 is pressed into the cylindrical hole 21 of the body portion 20, the support portion 41 is placed on the leading end side, and the end 20b of the body portion 20 on the other side D2 and the end 71b of the second support portion 71 are pressed to become flush with each other in the axis C direction by a well-known flat plate-shaped tool. When the tool comes into contact with the end 20b of the body portion 20, the valve portion 70 is not pressed with respect to the body portion 20. At this time, since the locked portion 45 is locked onto the locking portions 31 and 32 of the body portion 20, dropping of the valve portion 70 toward one side D1 over the second locking portion 32 can be more reliably prevented.

Since the lengths L6 and L7 mentioned above are equal to each other, as in the case where the locked portion 45 is locked onto the locking portions 31 and 32, the same effect is exhibited even in the case where the second locked portion 72 is locked onto the locking portions 31 and 32.

As described above, according to the spouted bag body 2 of this embodiment, the same function as that of the check valve is provided, and the contents can be allowed to easily come out by tilting the spout 10 downward without applying excessive pressure to the bag body 50.

In an umbrella type valve portion according to the related art, a support portion is provided on only one side of a movable portion formed in a disk shape, and thus there is a circumstance in that the direction of the valve portion needs to be adjusted when the valve portion is attached to a body portion.

Contrary to this, in the spouted bag body 2 of this embodiment, since the valve portion 70 has the support portions 41 and 71 which are symmetrical to each other with respect to the reference plane P, the direction of the valve portion 70 does not need to be adjusted when the valve portion 70 is attached to the body portion 20.

Furthermore, in this embodiment, the end 20b of the body portion 20 and the end 71b of the second support portion 71 may be configured so as not to be flush with each other in the axis C direction when the valve portion 70 is attached to the body portion 20 by locking the locked portion 45 onto the locking portions 31 and 32 of the body portion 20. This is because, even in this configuration, the valve portion 70 is pressed by using a tool corresponding to an uneven shape formed by the end 20b of the body portion 20 and the end 71b of the second support portion 71 or the like and thus the valve portion 70 is prevented from dropping toward one side D1 over the second locking portion 32.

The lengths L6 and L7 mentioned above may be different from each other as long as the locked portion 45 or 72 can be locked onto the locking portions 31 and 32.

While the first embodiment and the second embodiment of the present invention are described with reference to the drawings, specific configurations are not limited to the embodiments, and modifications, combinations, and omissions of the configurations are included without departing from the concept of the present invention. Moreover, it is needless to say that the configurations described in each of the embodiments can be appropriately combined for use.

Figure 11:
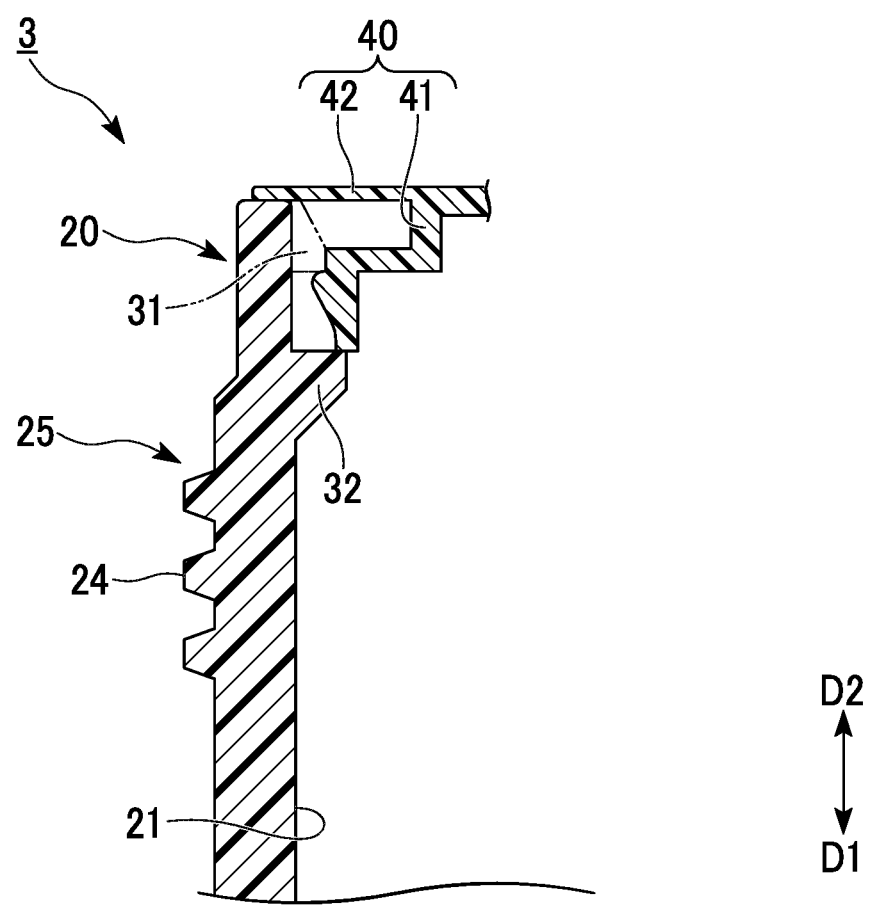
FIG. 11 is a cross-sectional view of main parts of a spouted bag body in an embodiment of a modification example of the present invention.

For example, in the first and second embodiments, as in a spouted bag body 3 shown in FIG. 11, the narrowed portion 29 and the receiving portion 33 may not be provided in the body portion 20 and the movable portion 42 of the valve portion 40 may be configured to directly come into contact with the edge portion of the opening of the cylindrical hole 21 of the body portion 20 on the other side D2 so as to cover the opening of the cylindrical hole 21 on the other side D2. In this modification example, the locking portions 31 and 32 are provided on the inner circumferential surface of the cylindrical hole 21 of the body portion 20. The movable portion 42 of the valve portion 40 is disposed outside the cylindrical hole 21 and only the support portion 41 of the valve portion 40 is disposed inside the cylindrical hole 21.

Even when the spouted bag body 3 is configured as described above, the same effects as those in the spouted bag bodies 1 and 2 of the above embodiments can be exhibited.

In addition, in the first and second embodiments, the body portion 20 is formed in a cylindrical shape. However, the cylindrical shape in this specification is not limited to a cylindrical shape, and means that a cross-sectional shape taken along a plane orthogonal to the axis C is a shape having an elliptical or polygonal contour.

The number of each of the locking portions 31 and 32 provided in the body portion 20 is four. However, the number of each of the locking portions 31 and 32 provided in the body portion 20 is not limited and may be 1 to 3, and may also be 5 or more. The number of the first locking portions 31 and the number of the second locking portions 32 provided in the body portion 20 may be different from each other.

The locking portions 31 and 32 may not be provided in the body portion 20 and furthermore the locked portion 45 may not be provided in the valve portion 40, and the support portion 41 of the valve portion 40 may be directly attached to the body portion 20 by fusing or the like. Even in this configuration, the function of the umbrella type valve portion 40 does not change.

The locking portions 31 and 32 may be provided to overlap each other when viewed in the axis C direction. This is because, even in the case where the body portion 20 or the locking portions 31 and 32 are integrally formed by injection molding, the shapes of the locking portions 31 and 32 can be formed by providing a slide in the mold for the injection molding.

In the first and second embodiments described above, the outer surface 45a of the locked portion 45 may not be inclined to become close to the axis C1 moving toward one side D1 and for example, may be formed to be parallel to the axis C1.

The receiving portion 33 may not be provided in the narrowed portion 29, and the movable portion 42 may be configured to directly come into contact with the edge portion of the opening of the through-hole 29a of the narrowed portion 29 on the other side D2 when the locked portion 45 is locked onto the locking portions 31 and 32.

The support portion 41 and the second support portion 71 are formed in a cylindrical shape. However, the shape of the support portions 41 and 71 is not limited thereto and may be formed in a columnar or prismatic shape or the like.

While preferred embodiments of the invention have been described and shown above, it should be understood that these are exemplary examples of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A spouted bag body comprising:
a spout having a body portion formed in a cylindrical shape, and a valve portion disposed inside a cylindrical hole of the body portion; and
a bag body attached to the body portion to seal an opening of the cylindrical hole on one side,
wherein the body portion is provided with a narrowed portion which protrudes from an inner surface of the cylindrical hole over an entire circumference thereof, and
the valve portion includes
a support portion attached to the body portion, and
a movable portion which is formed of a material having elasticity, is connected to the support portion, and covers an opening of the narrowed portion on the other side by coming into contact with an edge portion of the opening of the narrowed portion on the other side,
wherein the spout includes:
a first locking portion provided to protrude from an inner circumferential surface of the narrowed portion, and
a second locking portion provided to protrude from the inner circumferential surface of the narrowed portion at a position separated from the first locking portion on one side, and
wherein the support portion is provided with a locked portion which is locked onto the second locking portion on one side and is locked onto the first locking portion on the other side when the movable portion comes into contact with the edge portion of the opening of the narrowed portion on the other side.

2. The spouted bag body according to claim 1,
wherein the first locking portion and the second locking portion are provided so as not to overlap each other when viewed in an axis direction of the body portion.

3. The spouted bag body according to claim 1,
wherein a length of the locked portion in the axis direction of the body portion is shorter than a distance between the first locking portion and the second locking portion in the axis direction.

4. The spouted bag body according to claim 2,
wherein a length of the locked portion in the axis direction of the body portion is shorter than a distance between the first locking portion and the second locking portion in the axis direction.

5. The spouted bag body according to claim 1,
wherein the movable portion is formed in a plate shape,
the support portion is provided on one surface of the movable portion, and
the valve portion includes
a second support portion provided on the other surface of the movable portion, and
a second locked portion which is provided in the second support portion and is locked onto the second locking portion on one side and is locked onto the first locking portion on the other side when the other surface of the movable portion comes into contact with the edge portion of the opening of the narrowed portion on the other side.

6. The spouted bag body according to claim 2,
wherein the movable portion is formed in a plate shape,
the support portion is provided on one surface of the movable portion, and
the valve portion includes
a second support portion provided on the other surface of the movable portion, and
a second locked portion which is provided in the second support portion and is locked onto the second locking portion on one side and is locked onto the first locking portion on the other side when the other surface of the movable portion comes into contact with the edge portion of the opening of the narrowed portion on the other side.

7. The spouted bag body according to claim 3,
wherein the movable portion is formed in a plate shape,
the support portion is provided on one surface of the movable portion, and
the valve portion includes
a second support portion provided on the other surface of the movable portion, and
a second locked portion which is provided in the second support portion and is locked onto the second locking portion on one side and is locked onto the first locking portion on the other side when the other surface of the movable portion comes into contact with the edge portion of the opening of the narrowed portion on the other side.

8. The spouted bag body according to claim 4,
wherein the movable portion is formed in a plate shape,
the support portion is provided on one surface of the movable portion, and
the valve portion includes
a second support portion provided on the other surface of the movable portion, and
a second locked portion which is provided in the second support portion and is locked onto the second locking portion on one side and is locked onto the first locking portion on the other side when the other surface of the movable portion comes into contact with the edge portion of the opening of the narrowed portion on the other side.

9. The spouted bag body according to claim 1,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

10. The spouted bag body according to claim 3,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

11. The spouted bag body according to claim 4,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

12. The spouted bag body according to claim 5,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

13. The spouted bag body according to claim 6,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

14. The spouted bag body according to claim 7,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

15. The spouted bag body according to claim 8,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

16. The spouted bag body according to claim 2,
wherein a ring-like receiving portion having the axis of the body portion as a center axis is provided on a surface of the narrowed portion on the other side, and
when the valve portion is attached to the body portion by locking the locked portion onto the first locking portion and the second locking portion of the body portion, the movable portion comes into contact with the receiving portion.

* * * * *